F. Ashley,
Egg-Beater,
№ 55,802. Patented June 26, 1866.
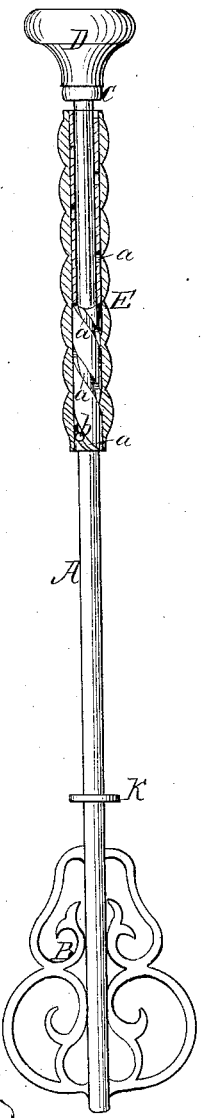
Witnesses; Inventor,

UNITED STATES PATENT OFFICE.

FREDERICK ASHLEY, OF NEW YORK, N. Y.

IMPROVED EGG-BEATER.

Specification forming part of Letters Patent No. 55,802, dated June 26, 1866.

*To all whom it may concern:*

Be it known that I, FREDERICK ASHLEY, of the city, county, and State of New York, have invented a new and useful Improvement in Egg-Beaters; and I do hereby declare that the following is a full, clear, and exact description thereof, which will enable others skilled in the art to make and use the same, reference being had to the accompanying drawing, forming part of this specification.

The present invention relates to that class of egg-beaters in which the beater for the eggs is formed at one end of a shaft or spindle, upon which is arranged a hollow sleeve or nut in such manner that by sliding it up and down upon such shaft a reciprocating rotary movement will be imparted thereto, and consequently to the beater, an egg-beater possessing this feature having been patented by me on the 1st day of May, A. D. 1860; and it consists in a novel connection of the said sliding sleeve or nut with the beater shaft or spindle, whereby a convenient and useful implement for the beating of eggs is secured, as will be obvious from the following detail description thereof, reference being had to the accompanying drawing, in which the figure represents a view of the egg-beater in the direction of its length, with the sliding nut or sleeve of its shaft or spindle in partial section.

A in the drawing represent the spindle or shaft of the egg-beater B, which shaft A is made smooth and plain for its entire length, and secured at one end, C, in and to a handle or knob, D, in any suitable manner, that while it can freely turn in such handle it cannot become detached therefrom. On this shaft or spindle A a sleeve or nut, E, is placed, so as to freely slide upon the same, the inside of which sleeve has a spiral groove or thread, $a$, extending its entire length, in which fits and is interlocked a pin or stud, $b$, of the shaft A, so that if the said slide is moved up and down upon the said shaft A a reciprocating rotary movement will be imparted thereto, and consequently to the beater B secured at one of its ends, as is obvious without further explanation, thus causing the beater to agitate or beat the eggs in which it may be placed, the movement of the slide being limited by the handle or knob D at one end of the shaft A and by the raised lip or flange K at or near the beater portion B thereof.

What I claim as new, and desire to secure by Letters Patent, is—

The grooved or screw-threaded slide or sleeve E, in combination with the plain shaft A, having a fixed stud or pin, $a$, and a beater, B, arranged together and operating as and for the purpose specified.

The above specification of my invention signed by me this 2d day of March, 1866.

FREDK. ASHLEY.

Witnesses:
M. M. LIVINGSTON,
ALBERT W. BROWN.